United States Patent [19]
Yoshino et al.

[11] Patent Number: 5,298,096
[45] Date of Patent: Mar. 29, 1994

[54] METHOD OF PRODUCING A LENS

[75] Inventors: Hisakazu Yoshino; Yukio Ishiba; Kunihiro Hayashi, all of Tokyo, Japan

[73] Assignee: Kabushiki Kaisha Topcon, Tokyo, Japan

[21] Appl. No.: 902,412

[22] Filed: Jun. 19, 1992

Related U.S. Application Data

[63] Continuation of Ser. No. 609,827, Nov. 6, 1990, abandoned.

[30] Foreign Application Priority Data

Nov. 14, 1989 [JP] Japan .................. 1-295369

[51] Int. Cl.⁵ ............................ B29D 11/00
[52] U.S. Cl. ......................... 156/64; 29/407; 29/464; 29/469; 264/1.4; 264/1.7; 264/40.1; 359/819; 359/900
[58] Field of Search ............. 156/64; 359/819, 900; 29/407, 464, 469; 264/1.4, 1.7, 40.1

[56] References Cited

U.S. PATENT DOCUMENTS

| | | | |
|---|---|---|---|
| 3,427,703 | 2/1969 | Baade | 350/417 |
| 3,599,377 | 8/1971 | Dartnell | 350/417 |
| 3,762,821 | 10/1973 | Bruning et al. | 350/417 |
| 3,924,936 | 12/1975 | Clark | 350/417 |
| 4,046,458 | 9/1977 | Smulders et al. | 350/417 |
| 4,496,416 | 1/1985 | Machler et al. | 156/64 |

FOREIGN PATENT DOCUMENTS

| | | | |
|---|---|---|---|
| 107307 | 6/1984 | Japan | 359/819 |
| 292116 | 12/1986 | Japan | 359/819 |

*Primary Examiner*—James Lowe
*Attorney, Agent, or Firm*—Brumbaugh, Graves, Donohue & Raymond

[57] ABSTRACT

A method of producing a high-precision lens system, such as a stepper lens, involves the following steps: (a) attaching a metal frame to the radial periphery of each of a plurality of lens elements at a prescribed distance from the optical axis of the element; (b) positioning the periphery of each metal frame at a prescribed radial distance from a reference axis to align the optical axis of each lens element along the reference axis; and (c) securing the individual lens sections together. Adjustment of the eccentricity of the individual lenses is accomplished by measuring the displacement of the lens-frame periphery from the reference axis.

5 Claims, 4 Drawing Sheets

METHOD OF PRODUCING A LENS

This application is a continuation of application Ser. No. 07/609,827, filed on Nov. 6, 1990 and now abandoned.

BACKGOUND OF THE INVENTION

The present invention relates to a method of producing a lens wherein assembling is made by inserting lens elements fixed to lens frames into a body tube and, in particular, to a method of producing a lens most suitable for the production of a high-performance lens such as a stepper lens for printing a reduced image of an original plate on a wafer for the production of VLSI.

In the prior lens system, a plurality of lens elements (e.g., single lenses and compound lenses) are placed in cylindrical metal frames and are fixed in the cylindrical metal frames by holding rings as shown in FIG. 8(a), or caulking (fitting) as shown in FIG. 8(b), or with an adhesive. In this case, it is required to take care not to strain the lens surface by the fixing between the lens element and the metal frame.

Centering and grinding of the metal outer frame are effected with the optical axis of the lens used as a reference and the lens parts thus centered are successively inserted into a precisely worked cylinder to assemble a lens.

The cylinder is worked taking a fit clearance between the cylinder and the lens frame that is very small (for example in the order of 5 microns), so that the eccentricity can be minimized as a final lens system.

However, although the above prior lens assembling method can satisfy adequate precision for a small lens system such as an objective lens for microscopes which is light in weight and small in size and the field of view of which has a diameter of about 1 mm, in the case of a lens which has a large aperture and a large size and the field of view of which has a diameter of about 21 mm or over such as a stepper lens for the production of semiconductors (a lens for forming and printing an image of an original plate on a wafer) which is one of most precise lenses produced by the modern technology, there is a problem that adequate precision cannot be retained. In particular, the recent demand for high resolving power and high precision resulted from the enlargement of the field has raised the following problems.

Although the prior fit clearance between a lens frame and a cylinder is in the order of 5 microns, which is limit in view of the assembling work, in the recent high-precision lens, this fit tolerance is accompanied by a problem that the demanded precision cannot be retained. Further, since a stepper lens and the like have been made large in size, there is a problem that, by the use of the precision of the current working machine, the working precision of the inner diameter of a cylinder cannot meet the demanded precision. Further since the method of assembling a lens is an insertion system, there arises a problem that an external force is exerted to the lens frame at the time of assembling to strain the lens. Further, since it is required to insert lens elements into a cylinder, it is necessarily required to assemble lens units with them arranged horizontally (placed side by side) and the deformation caused by the weight of the cylinder and the lens frames themselves cannot be ignored, leading to a problem that high assembling precision cannot be retained. Since the stepper lens is quite heavy, the influence of its own weight on the deformation is quite a serious problem.

Accordingly, appearance of a method of producing a lens is strongly desired wherein the eccentricity error between lens elements at the time of assembling of a lens system is suppressed to 0.5 micron or below, consideration for the working precision of the inner diameter of a cylinder is not required, and lens elements can be assembled in a vertical position which is the same as the use condition.

BRIEF DESCRIPTION OF THE DRAWINGS

The drawings show embodiments of the present invention, wherein.

DESCRIPTION OF THE INVENTION

Figure 1:
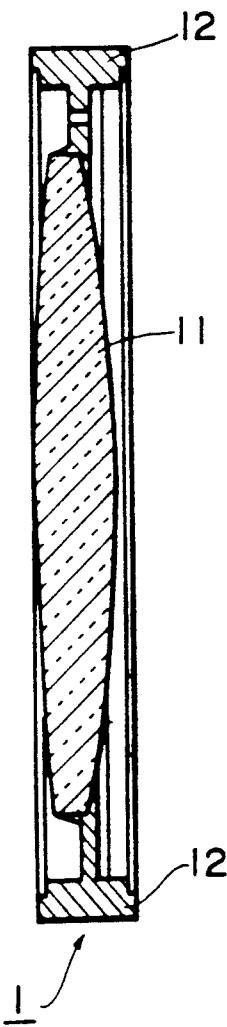
FIG. 1 is a diagram illustrating a lens section consisting of a metal frame and a lens element.

An embodiment of the present invention will now be described with reference to the drawings. As shown in FIG. 1, a lens section 1 is composed of a lens element 11 and a metal frame 12 attached to the outer peripheral section of the lens element 11. The metal frame 12 acts as a lens section periphery and it is suitable that the metal frame 12 is made of brass because it is good in workability, or when it is desired that the metal frame 12 is to be made light in weight, the metal frame 12 is made of aluminum or if the thermal expansion must be taken into consideration it is most suitable that the metal frame 12 is made of Invar iron-nickel alloy or the like. The lens element 11 and the metal frame 12 are fixed, for example, by using a holding ring, caulking or an adhesive, and by this fixing the attachment can be effected carefully with no stress being applied to the lens element. Because the surface of the lens element 11 is a highly accurate ground surface in the order of 0.01 to 0.03 microns made by PV, if a little stress is applied, the surface shape will be changed. If this is taken into consideration, caulking or adhesive is preferably used. The centering work of the lens section 1 is made by a precision lathe with precision in the order of a few seconds. Since a common lens system is made by combining several different lens elements 11, it is required to attach a metal frame 12 to each lens element 11.

Figure 2:
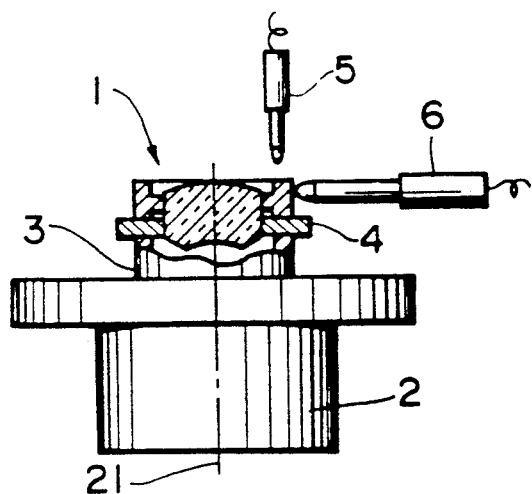
FIG. 2 is a diagram illustrating the state wherein the lens section is placed on a rotating table.

Next, the lens section 1 is placed on a rotating table 2 shown in FIG. 2 to effect the assembling of a lens system. This rotating table 2 is one that uses an air bearing or the like and is high in precision and rigidity. The rotating table 2 used in this embodiment is one whose rotating accuracy is 0.02 micron or below. A back cover 4 of the lens system is placed through a jig 3 on the rotating table 2. At that time, it is required that the jig 3 and the back cover 4 are precisely worked by a precision lathe. Particularly, the degree of the parallel and the planeness of the upper surface and the undersurface is important. It is adjusted that the upper surface of the back cover 4 is made vertical to the rotating axis 21 of the rotating table 2 and a lens section (first lens section) 1A located in the lowermost position in the lens system is placed on the back cover 4. It is confirmed by a first displacement sensor 5 whether the lens section 1A is inclined or not. Further, while the rotating table 2 is rotated, sway of the outer peripheral wall of the lens section 1A is measured by a second displacement sensor 6, and fine adjustment is effected to minimize the measured value. This fine adjustment may be carried out manually by an operator or may automatically be carried out by using a piezo-element or the like. By these operations, the centering of the lens section 1 can be effected with the adjustment in the order of 0.2 to 0.5 micron and the assembling can be effected with precision of one tenth or below of the prior art.

After the completion of the centering work, the lens section 1 is fixed to the back cover 4 using an adhesive or the like.

Figure 3:
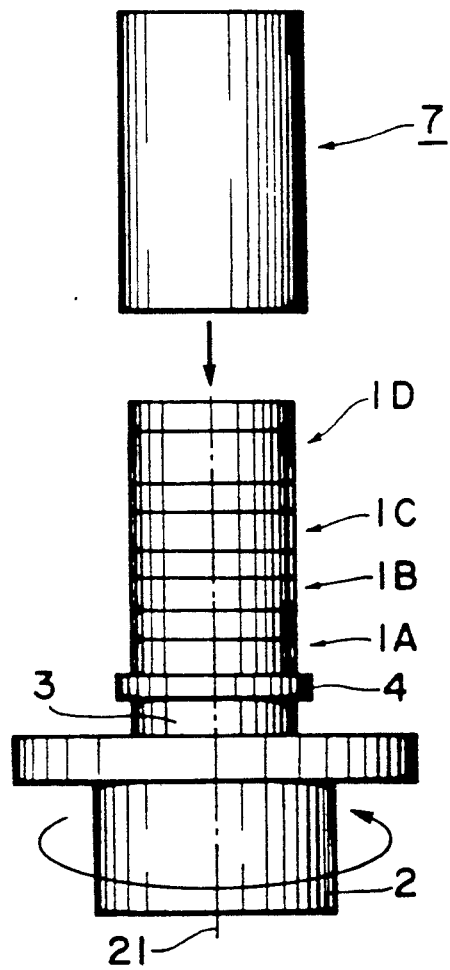
FIG. 3 is a diagram illustrating a step of putting a cylinder after assembling and adjustment of the lens sections
Figure 5:
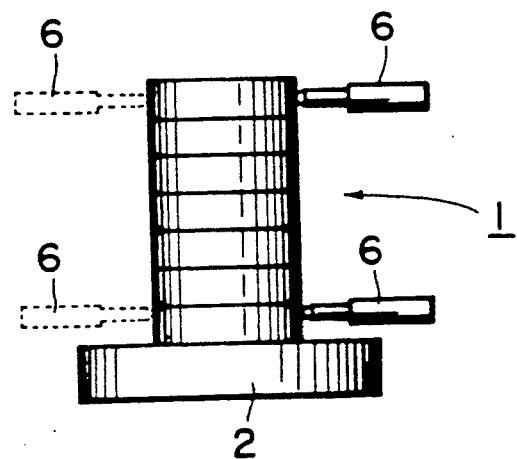
FIG. 5 is a diagram illustrating a method of stacking and adjusting the lens sections.

Further, a second lens section 1B is placed on the first lens section 1A, and while the rotating table 2 is rotated the outer peripheral section of the metal frame 12 is measured with the rotating axis 21 of the rotating table 2 used as a reference. As a result, the centering (positioning) and the confirmation of the inclination of the lens element 11 can be carried out, and after the completion of this adjustment, the first lens section 1A and the second lens section 1B are fixed by using an adhesive or the like. Similarly, a third lens 1C is placed on the second lens section 1B, and after adjustment thereof, they are fixed. Further, as shown in FIG. 5, lens sections 1, 1, . . . are stacked and after adjusting successively them, a cylinder 7 is put as shown in FIG. 3 to complete the assembling of the system. In this embodiment, it should be noted that before the cylinder 7 is put, since the adjustment of the eccentricity of the whole group of the lenses has been completed, it is not required to increase the accuracy of the inner diameter of the cylinder 7 as in the prior art, and it is only enough if the working is done such that the cylinder 7 is out of contact with the outer peripheral wall of each of the stacked lens sections 1A, 1B, . . . .

Figure 4:
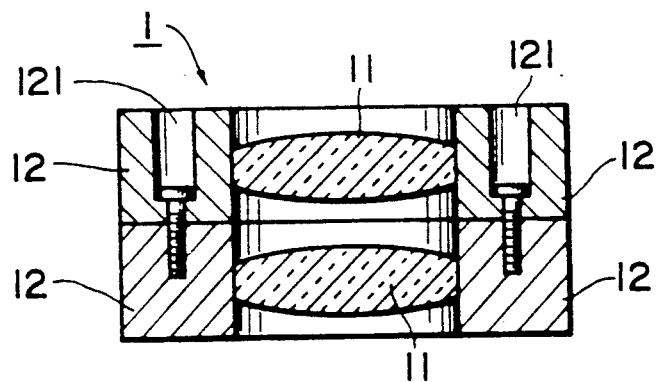
FIGS. 4(a) and 4(b) is diagrams illustrating other method of fixing lenses.
Figure 4:
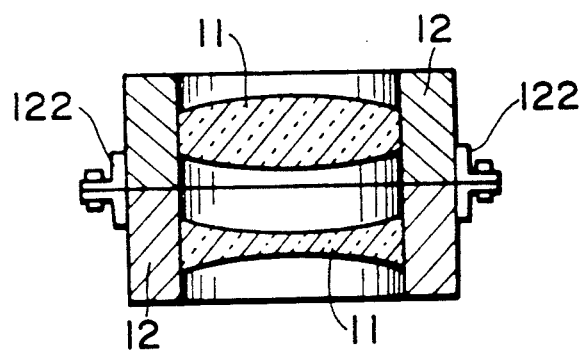

The fixing between the lens sections 1A, 1B, . . . is not limited to the use of an adhesive but can be effected by forming tapped holes 121, 121 in the metal frames 12 and screwing them as shown in FIG. 4(a), or by forming fixing sections 122, 122 on the outsides of the metal frames 12 and screwing them as shown in FIG. 4(b).

In this embodiment, although the adjustment of the eccentricity is carried out by using the rotating table 2, it is possible to carry out the adjustment while the outer peripheral wall of the lens section 1 placed on a base is measured by a three-dimensional measuring device without use of the rotating table 2.

Since the embodiment constituted as described above is a method of assembling a lens system while measuring the lens sections 1A, 1B, . . . with the metal frames 12, the method has an effect that the lens eccentricity due to the fit clearance between the cylinder 7 and the lens frames that remains to the last in the prior method can be decreased to about one tenth. Further, since the lens system can be assembled with the system vertically positioned, which is the same condition as in the final use condition, there is an effect that the influence of the weight of the cylinder 7 and the lens sections 1A, 1B, . . . which will cause deformation when the assembling is performed can be eliminated. That is, there is an effect that lowering of the performance can be prevented that will be caused in the prior assembling method where the lens system is assembled with it placed horizontally and then it is used vertically.

Figure 6:
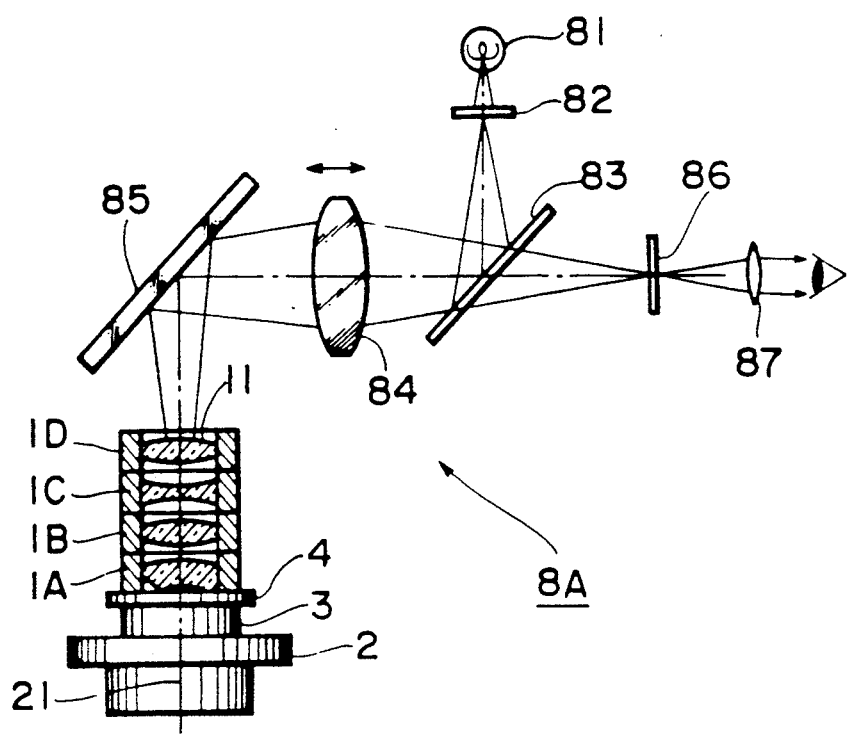
FIG. 6 is a diagram illustrating the constitution of a reflection type eccentricity measuring device.

Now, a modified embodiment of the present invention will be described with reference to FIG. 6. Although the above method of assembling and adjustment is carried out by measuring the displacement of the outer wall (frame member) of the lens section 1, the adjustment of the eccentricity can be carried out by measuring the reflection or transmission eccentricity from the lens element 11 by using an eccentricity measuring device 8. First, the case using a reflection type eccentricity measuring device 8A is described. The eccentricity measuring device 8A consists of a light source 81, a target 82, a half mirror 83, an objective lens 84, a mirror 85, a cursor 86, and an eyepiece 87. First, lens sections 1A, 1B, . . . are placed on the rotating table 2 and centering is carried out with the rotating axis (reference axis) 21 of the rotating table 2 used as reference. That is, the optical axis of the lens section 1 is set in parallel with the reference axis. Further, adjustment is carried out in such a manner that the image of the target 82 illuminated with the light source 81 of the eccentricity measuring device 8 is formed at the center of the curvature of the lens element 11 at the lens section 1D through the objective lens 84 and the mirror 85. That is, the eccentricity measuring device 8A is adjusted for the lens section 1D so that the image of the target 82 may be formed at the center of the curvature of the lens element 11. Then, if the rotating table 2 is rotated with that state being kept and the center of the curvature of the lens element 11 is in register with the rotating axis 21 of the rotating table 2 (i.e., there is no eccentricity), the reflected image of the target 82 formed in the lens section 1D by the lens element 11 remains unshifted on the cursor 86. However, if the lens element 11 formed in the lens section 1D is eccentric relatively to the rotating axis 21 of the rotating table 2, the reflected image formed in the target 82 rotates on the cursor 86 along with the rotation of the rotating table 2. When this displacement is read from the scale formed on the cursor 86, the eccentricity of the lens element 11 can be measured. By adjusting that eccentricity so as to minimize it, the eccentricity of the lens system can be adjusted. In this embodiment, although adjustment of the eccentricity of the uppermost lens section 1D is described, if adjustment of the eccentricity of the lens section 1C is to be carried out, the eccentricity measuring device 8 will be adjusted to form an image in the center of the curvature of the lens element 11 formed in the lens section 1C.

It is also possible that adjustment of the eccentricity of the lowermost lens section 1A is first carried out and stacking is effected successively while the adjustment is carried out.

After the completion of the adjustment of the eccentricity in that manner, lens sections 1 are fixed with an adhesive or the like and a cylinder 7 is put on and fixed to complete the assembling of the lens system.

Figure 7:
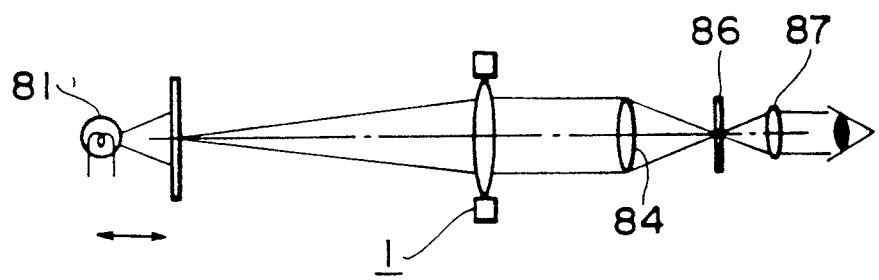
FIG. 7 is a diagram illustrating the constitution of a transmission type eccentricity measuring device.
Figure 8A:
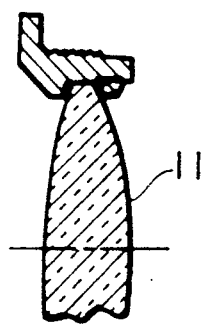
FIGS. 8(a) and 8(b) is diagrams illustrating the prior holding ring way and the prior caulking way.
Figure 8B:
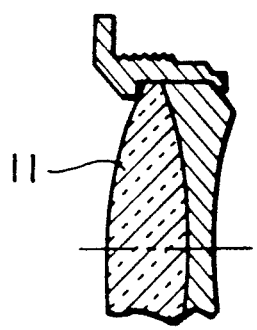

As the eccentricity measuring device, not only a reflection type eccentricity measuring device 8A mentioned above but also a transmission type eccentricity measuring device 8B shown in FIG. 7 can be used. In the transmission type eccentricity measuring device 8B, a light source 81 and an optical system of the transmission type eccentricity measuring device 8B are opposed with the lens sections 1A, 1B, . . . arranged between them. The light flux from the light source 81 is transmitted through the lens sections 1A, 1B, . . . and the image formed in an objective lens 84 is read on a cursor 86. The method of the adjustment is similar to that of the reflection type eccentricity measuring device 8A and therefore its explanation is omitted.

In this embodiment, without using the rotating table 2, the lens sections 1, 1, . . . may be placed on a base and adjustment of the eccentricity can be carried out while the eccentricity is measured.

Figure 9:
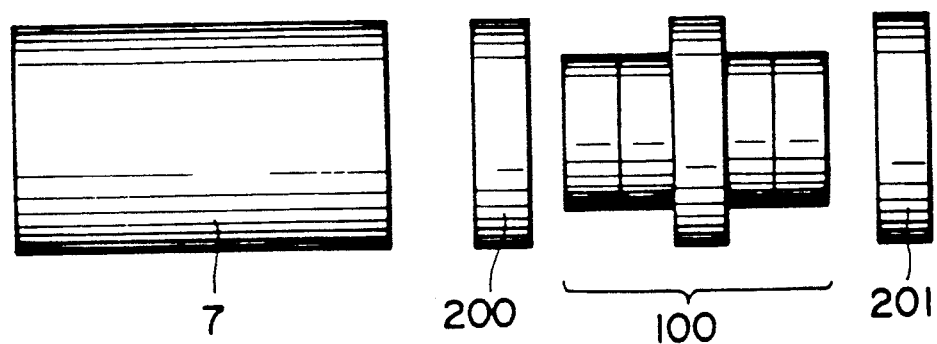
FIG. 9 is a diagram showing a modified embodiment that is a combination of a lens formed by the present production method and a lens formed by a prior production method.

Further as in shown in FIG. 9, to produce a lens group 100 which is required to be highly precise, the present invention is used, and onto a lens section 200 and a lens section 201 which are not required to be highly precise, a cylinder 7 can be put and fixed for the production in a conventional manufacturing manner.

According to the present invention constituted as above, a lens can be produced by forming each lens section outer periphery with a prescribed distance from the optical axis of each lens section, placing the first lens section with the optical axis thereof in parallel with the rotating axis of a rotating table, positioning the lens outer periphery of each lens section at a prescribed distance from the rotating axis while rotating the rotating table, and fixing the lens sections. Further, it is also possible that by measuring the outer periphery diameter distance of each lens section, the outer periphery of each lens section can be positioned at a definite distance from the rotating axis of the rotating table.

The present invention can produce a lens by placing a first lens section on a base with the optical axis aligned with a reference axis, measuring the eccentricity of each lens section by reflection or transmission to position each lens section, and fixing the lens sections.

Further, the present invention can produce a lens by forming a frame member for each lens section, placing the first lens section with its optical axis in parallel with the rotating axis of a rotating table, measuring the eccentricity of each lens section by reflection or transmission while rotating the rotating table to position each lens section, and fixing the lens sections.

According to the present method for producing an objective lens that consists of a plurality of lens sections and is used in a vertical position, a lens is produced by forming a frame member for each lens section at a prescribed distance from its optical axis, measuring the outer periphery of the frame member to place each lens section with its optical axis aligned, and fixing the lens sections.

It is also possible to produce a lens by inserting and fixing some lens sections out of several lens sections in a cylinder by a conventional manufacturing method, and producing the remaining lens sections by the present lens manufacturing method.

Since the present invention constituted as above comprises a first step of forming a lens section outer periphery at a prescribed distance from the optical axis of each lens section, a second step of placing the first lens section on a rotating table with its optical axis in parallel with the rotating axis of the rotating table, a third step of positioning the lens outer periphery of each lens section at a definite distance from said rotating axis while rotating said rotating table, and a fourth step of fixing the lens sections, several lens sections can be stacked and adjusted while the outer periphery of each lens section is measured, so that there is an effect that the lens eccentricity due to the fit clearance between the cylinder and the lens frames that will remain to the last in the prior manufacturing method can be made zero. Further, there is no need to keep highly precise the working preciseness of the inner diameter of the cylinder and therefore there is an effect that a highly precise product as a whole lens system can be realized. Further, since there is no need to assemble by inserting lens frames into a cylinder, there is an effect that when a lens system is assembled, each lens element will not be strained. Further, since a lens system can be assembled in a vertical position which is the same condition as the final use condition, there is an effect that the influence of its own weight on deformation at the time of assembling can be eliminated.

In the present invention, since adjustment of the eccentricity of a lens element can be effected by measuring the outer periphery diameter distance of each lens section, there is an effect that assembling and adjustment can be effected simply and highly precisely.

Since the present invention comprises a first step of placing a first lens section on a base so that the optical axis may be aligned with a reference axis, a second step of measuring the eccentricity of each lens section through reflection or transmission to position each lens section, and a third step of fixing the lens sections, adjustment of the eccentricity of the lens element can be effected without allowing the lens sections to be touched and therefore there is an effect that excellent assembling precision can be retained.

In the present invention, since a frame member is formed for each lens section and each lens section can be positioned by measuring the eccentricity of each lens section through reflection or transmission while rotating a rotating table, there is an effect that eccentric position adjustment can be effected simply by using the frame member for each lens section.

In the present invention, each lens section is formed with a frame member at a prescribed distance from its optical axis, the outer periphery of the frame member is measured to arrange lens sections with their optical axes aligned, and the lens sections are fixed to assemble a lens highly precisely.

What is claimed is:

1. A method of producing an objective lens made up of a plurality of lens sections, each comprising a lens element supported within an annular metal frame, and assembled one upon another, comprising the steps of:
 (a) attaching an annular metal frame around the outer periphery of each of a plurality of circular lens elements to form a plurality of lens sections;
 (b) centering the lens element relative to the metal frame by precisely shaping the metal frame such that the outer periphery of the metal frame of each lens section is positioned at a prescribed distance from the optical axis of the lens element;
 (c) placing a first of said plurality of lens sections on a table which is rotatable about a vertical rotational axis with the optical axis of its lens element in parallel with the rotational axis of the table;
 (d) while rotating the table, positioning the outer periphery of the metal frame of said first lens section at a prescribed radial distance from the rotational axis of the table to align the optical axis of the lens element with the rotational axis of the table, wherein a first displacement sensor indicates whether the first lens section is inclined, and variation of the outer periphery of the first lens section is measured by a second displacement sensor, and wherein fine adjustment is effected to minimize the measured value;

(e) stacking at least one additional lens section on said first lens section;

(f) while rotating the table, positioning the outer periphery of the metal frame of said at least one additional lens section at a prescribed radial distance from the rotational axis of the table to align the optical axis of its lens element with the rotational axis of the table; and (g) securing the metal frames of said first and said at least one additional lens sections together.

2. A method according to claim 1, wherein in steps (d) and (f) the outer periphery of the metal frame of each lens section is positioned at a prescribed radial distance from the rotational axis of the table by measuring the outer periphery diameter of each frame.

3. A method according to claim 1, including the further steps of: (h) inserting the secured together lens sections obtained in step (g) into a hollow cylinder; and (i) affixing said lens sections to said cylinder.

4. A method according to claim 1, wherein in step (e) the lens sections stacked on said first lens section are each positioned a predetermined distance upwardly from the lens section immediately below it and its frame secured to the frame thereof.

5. A method according to claim 4, including the further steps of inserting the secured together lens sections into a hollow cylinder, and affixing said lens section to said cylinder.

* * * * *